F. S. VOGT.
CAMERA SHUTTER CONTROL MECHANISM.
APPLICATION FILED MAY 13, 1916.
1,283,604.
Patented Nov. 5, 1918.
2 SHEETS—SHEET 2.
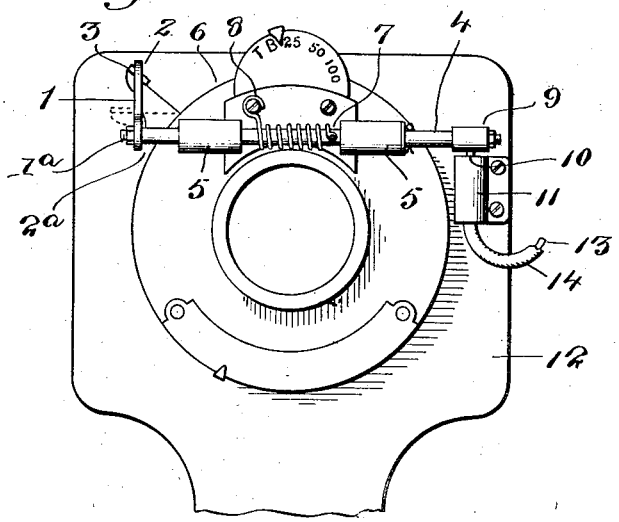
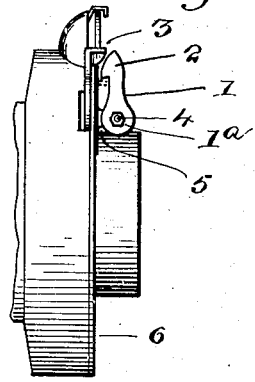
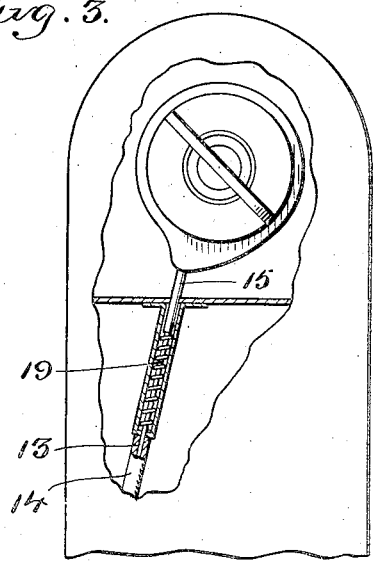
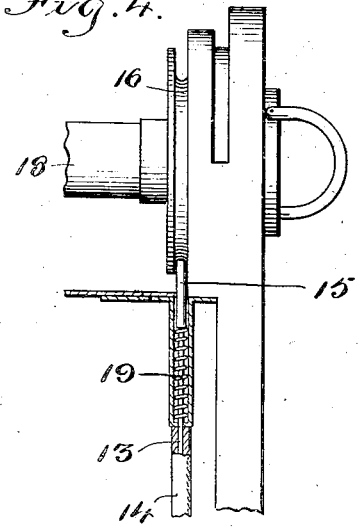
Witnesses
E. R. Ruppert.
Wm R. Smith
Inventor
F. S. Vogt
By Victor J. Evans
Attorney

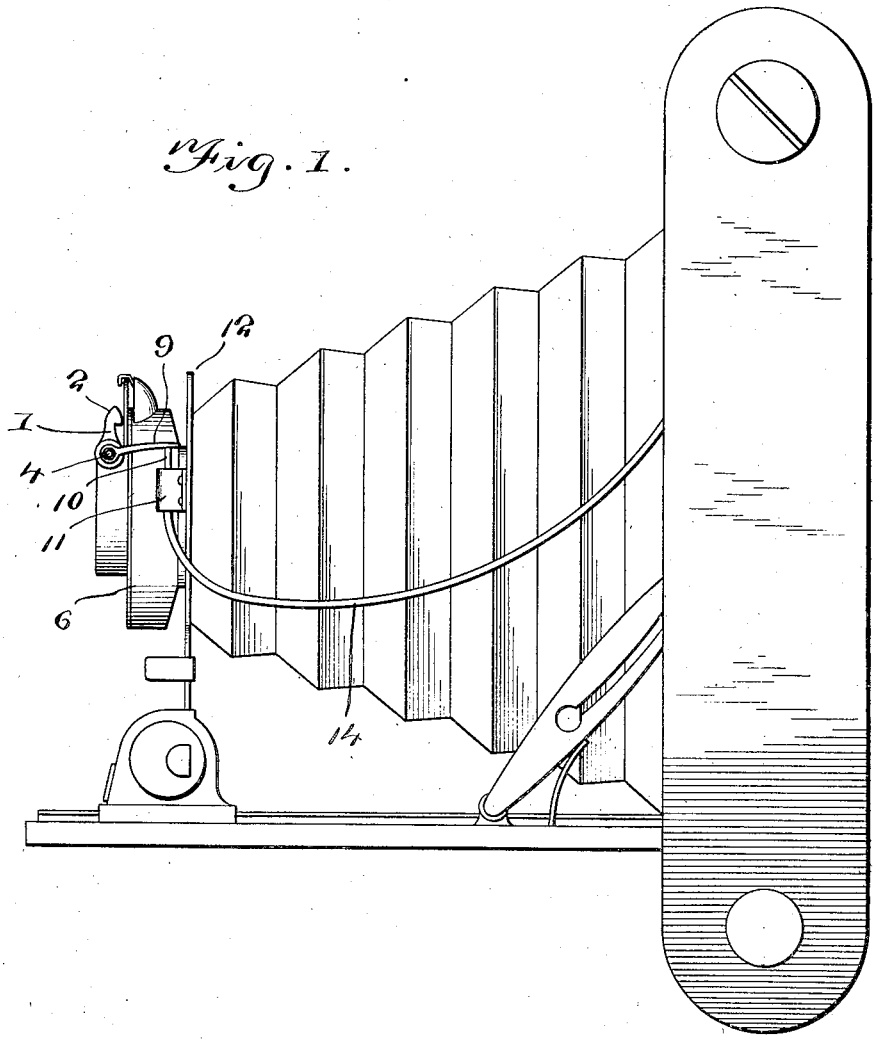

UNITED STATES PATENT OFFICE.

FRANK S. VOGT, OF LOUISVILLE, KENTUCKY.

CAMERA-SHUTTER-CONTROL MECHANISM.

1,283,604.  Specification of Letters Patent.  Patented Nov. 5, 1918.

Application filed May 13, 1916. Serial No. 97,328.

*To all whom it may concern:*

Be it known that I, FRANK S. VOGT, a citizen of the United States, residing at Louisville, in the county of Jefferson and State of Kentucky, have invented new and useful Improvements in Camera-Shutter-Control Mechanism, of which the following is a specification.

This invention relates to camera shutter mechanism, and the invention consists in certain novel means for locking the shutter and permitting the release of the latter when one of the film rolls has been turned to a predetermined extent.

With these and other objects in view the invention will be better understood from the following detailed description taken in connection with the accompanying drawing, wherein—

Figure 1 is a side elevation of the camera showing my invention applied thereto.

Fig. 2 is a front elevation thereof on an enlarged scale.

Fig. 3 is a detail vertical sectional view of a portion of the camera showing the coöperation between the cam and another element of the invention.

Fig. 4 is a cross sectional view of Fig. 3.

Fig. 5 is an enlarged view of a portion of the invention.

Referring to the drawings the numeral 1 designates a locking element shown in this particular instance as in the form of a hook, the bill 2 of which is arranged to coöperate with the shutter control arm 3. This hook 1 is detachably mounted upon one end of a shaft 4 by a nut 1ª coöperating with a flange 2ª carried by the shaft. The shaft 4 is journaled in bearings 5 carried by the lens casing of the camera. Encircling that portion of the shaft between the bearings 5 is a coil spring 7, one extremity of which is secured to the shaft, the other extremity engaging the head of a screw 8 mounted in the casing 6. The purpose of this spring is to move the hook 1 into locking engagement with the arm 3 when the latter reaches a predetermined position and to also hold an arm 9 carried by the other end of the shaft in good contact with a plunger 10 which is slidably mounted in a bearing 11 carried by the front support 12 of the camera.

For the purpose of transmitting motion to the shaft and according to the passage of the film to a position to be exposed, I provide a flexible element 13 in the form of a wire mounted in the tubing 14. This wire has one extremity secured to the plunger 10 while its opposite extremity is connected to a second plunger 15 having one end mounted in a groove 16′ formed in the peripheral surface of a cam 16 rigidly secured to one of the film spools 18. For holding the plungers 10 and 15 in a normal position, I provide a coil spring 19 mounted in the tubing and exerting a pressure against the plunger 15.

From the foregoing description it will be seen that when the shutter is operated for taking a picture the arm 3 will assume a position under the bill of the hook 1 and the hook must be released by the unwinding operation of one of the film rollers before another section of film can be exposed.

What I claim is:

In a device of the class described, a film roll, a cam carried thereby, a plunger engaging the cam, a flexible member operated by the plunger, a plunger operated by the other end of said flexible member, both of said plungers being under spring control, a shutter casing provided with an opening, bearing members mounted on the shutter casing and above the opening therein, a shaft carried by said bearing members, an arm carried by the shaft and engaged by the second named plunger, a spring tending to maintain said shaft in a given position and having connection with the shaft and with a stationary element, a hook carried by said shaft and adapted to engage and lock said shutter when the latter closes, after exposing the film, and to disengage the shutter when the plungers are operated by said cam upon the rotation of the film roll.

In testimony whereof I affix my signature.

FRANK S. VOGT.